Patented Apr. 28, 1942

2,281,483

UNITED STATES PATENT OFFICE 2,281,483

PROCESS OF PREPARING LAMINATED MATERIAL

Donald Edwards Edgar, Philadelphia, Pa., assignor to E. I. du Pont de Nemours & Company, Wilmington, Del., a corporation of Delaware No Drawing. Original application June 23, 1934, Serial No. 732,083. Divided and this application May 1, 1940, Serial No. 332,687

14 Claims. (Cl. 154—2)

This invention relates to adhesive compositions, and more particularly, to heat energizable compositions comprising a synthetic resin and a cellulose nitrate.

This application is a division of my application Ser. No. 732,083, now Patent No. 2,234,236, which is a division of my prior application Ser. No. 658,270, now Patent No. 2,064,802.

An object of the present invention is to provide adhesive compositions comprising a thermoplastic synthetic resin and cellulose nitrate, which adhesive compositions are heat energizable and do not depend upon evaporation of solvent for obtaining a suitable bond. A further object is to provide an adhesive composition which does not require high temperatures to secure thermohardening to give a suitable bond and which is not dependent on any chemical change for the attainment of such bond.

A further object is to provide heat energizable adhesives which are highly resistant to water, thereby affording a substantially waterproof joint.

A still further object is to provide a heat energizable adhesive which is of good color so that its utility in conjunction with light colored or transparent materials is not precluded. A further object is to provide such an adhesive which is initially and permanently flexible and is substantially inert so that it is not appreciably affected by normal temperatures or exposure to the air.

Another object is to provide a heat energizable adhesive which will give a bond not softening under conditions of normal or slightly elevated temperatures, so that slippage of the cemented surfaces does not take place.

A still further object is the provision of a heat energizable cement which is sufficiently elastic so that differences in the coefficient of linear expansion of two dissimilar materials which are joined by a film of said adhesive does not destroy the effective bond between the materials.

A further and particular object of the invention is to provide a heat energizable adhesive which will give a bond of exceptional strength as compared with heretofore known adhesives.

The above objects are accomplished according to the present invention by the combining of a thermoplastic synthetic resin with a cellulose nitrate in a heat energizable adhesive. A preferred form of the adhesive of the present invention comprises a cellulose nitrate having a nitrogen content of 10.0 to 12.2% and a polyhydric alcohol-polybasic acid synthetic resin modified by an agent from the group consisting of vegetable drying and semi and non-drying oils, stearic acid, oleic acid, and higher alcohols such as butyl, and amyl alcohol, et cetera, dispersed in a suitable solvent mixture.

The following examples are given to illustrate the invention:

Example 1

| | Per cent |
|---|---|
| Cellulose nitrate (approximately 4 sec. viscosity) | 8.2 |
| Denatured alcohol | 10.0 |
| Toluol | 29.0 |
| Dibutyl phthalate | 6.4 |
| Ethyl acetate | 33.0 |
| "Synthetic" resin* | 13.4 |
| | 100.0 |

Example 2

| | Per cent |
|---|---|
| Cellulose nitrate (approximately 2 sec. viscosity) | 8.2 |
| Denatured alcohol | 10.0 |
| Toluol | 29.0 |
| Ethyl acetate | 33.0 |
| Dibutyl phthalate | 6.4 |
| "Synthetic" resin* | 13.4 |
| | 100.0 |

*The "synthetic" resin in the above examples is a reaction product of:

| | Per cent |
|---|---|
| Phthalic anhydride | 45.8 |
| Glycerol | 28.8 |
| Castor oil | 25.4 |
| | 100.0 |

The resin was compounded by charging the above ingredients into an aluminum kettle fitted with a mechanical stirring device and a thermometer. The batch was heated up to 225° C. in thirty minutes and held at this temperature until an acid number of 13–15 was reached, stirring being maintained throughout the run. The heating cycle took about 4½ hours.

The viscosities given throughout this specification are measured in accordance with method outlined in A. S. T. M. Tentative Specifications and Tests for soluble nitrocellulose, designation D–301–30T. The nitrogen content of the cellulose nitrate in the above examples was 11.8 to 12.15%.

The two above formulas are quite similar except for the ultimate viscosity of the adhesive, the first having approximately twice the viscosity of the second.

Example 3

| | Per cent |
|---|---|
| Cellulose nitrate (approximately 2 sec. viscosity) | 8.2 |
| Denatured alcohol | 10.0 |
| Toluol | 33.0 |
| Ethyl acetate | 29.0 |
| Dibutyl phthalate | 6.4 |
| "Synthetic" resin* | 13.4 |
| | 100.0 |

*The "synthetic" resin in this formula was the reaction product of:

| | Per cent |
|---|---|
| Phthalic anhydride | 40.5 |
| Stearic acid | 35.4 |
| Glycerine | 24.1 |
| | 100.0 |

The resin was prepared as described in Example 1.

This example represents a slight modification of Example 2, whereby a slight residual tackiness inherent in the composition of Example 2 is eliminated, thus permitting materials coated with the modified composition to be stored with surfaces adjacent to each other without danger of sticking. This adhesive composition gives substantially odorless and tasteless films, thus making it quite suitable for use in connection with food products. The cellulose nitrate in this example was the same as that in the two previous examples.

Example 4

| | Per cent |
|---|---|
| Cellulose nitrate | 10.0 |
| Tricresyl phosphate | 3.0 |
| Ethyl acetate | 15.0 |
| Toluol | 22.0 |
| Denatured alcohol | 30.0 |
| "Synthetic" resin* | 20.00 |
| | 100.0 |

*The "synthetic" resin in this formula was the reaction product of:

| | Per cent |
|---|---|
| Phthalic anhydride | 54.3 |
| Glycerine | 24.2 |
| Castor oil | 21.5 |
| | 100.0 |

This resin was prepared by charging all of the ingredients into a kettle and heating to 200° C. in 1½ hours. This temperature was maintained for approximately two hours or until an acid number of 73–77 was reached.

Example 5

| | Per cent |
|---|---|
| Cellulose nitrate | 10 |
| Ethyl acetate | 20 |
| Toluol | 30 |
| Denatured ethyl alcohol | 28 |
| "Synthetic" resin* | 12 |
| | 100 |

*The "synthetic" resin in this example was the reaction product of:

| | Per cent |
|---|---|
| Diethylene glycol | 41.7 |
| Phthalic anhydride | 58.3 |
| | 100.0 |

The resin was prepared by charging the materials into a kettle and heating to 240–250° C. and maintaining this temperature until an acid number under 40 was obtained. This required slightly under four hours to accomplish.

The cellulose nitrate used in the above two examples (Examples 4 and 5) had a nitrogen content of approximately 10.6%.

Example 6

| | Per cent |
|---|---|
| Cellulose nitrate (nitrogen 11.4 to 11.6%) | 9.9 |
| Denatured ethyl alcohol | 5.8 |
| Ethyl acetate | 40.0 |
| Toluol | 32.6 |
| Acetone | 1.2 |
| Dibutyl phthalate | 4.4 |
| "Synthetic" resin* | 6.1 |
| | 100.0 |

*The "synthetic" resin in this formula was the reaction product of:

| | Per cent |
|---|---|
| Diethylene glycol | 37.4 |
| Phthalic anhydride | 47.6 |
| Stearic acid | 15.0 |
| | 100.0 |

The resin was prepared by charging the materials into a kettle and heating to 190–200° C. This temperature was maintained for approximately 4 hours, at the end of which time the acid number was 40–50.

Example 7

| | Per cent |
|---|---|
| Cellulose nitrate (nitrogen 11.4 to 11.6%) | 10.0 |
| Denatured alcohol | 6.0 |
| Ethyl acetate | 37.0 |
| Toluol | 32.5 |
| Dibutyl phthalate | 4.5 |
| "Synthetic" resin* | 10.0 |
| | 100.0 |

*The "synthetic" resin in this example is the same as that used in Example 6.

Example 8

| | Per cent |
|---|---|
| Cellulose nitrate (80 sec. viscosity) | 11.3 |
| Denatured alcohol | 8.6 |
| Dibutyl phthalate | 13.5 |
| Toluene | 16.0 |
| Ethyl acetate | 19.0 |
| "Synthetic" resin | 30.7 |
| | 100.0 |

The nitrogen content of the cellulose nitrate in this example is 11.4–11.6% and the "synthetic" resin is the same as used in Example 6. This composition is particularly suited for coating on fabrics and other porous surfaces because of its relatively high viscosity which prevents undesirable impregnation.

Example 9

| | Per cent |
|---|---|
| Cellulose nitrate (½ sec. viscosity) | 15.0 |
| Denatured alcohol | 15.0 |
| Ethyl acetate | 31.0 |
| Dibutyl phthalate | 8.0 |
| Toluol | 15.0 |
| "Synthetic" resin* | 16.0 |
| | 100.0 |

*The "synthetic" resin in this formula is a toluene-sulfonamide-formaldehyde condensation product. The adhesive dried to practically a tack-free stage before joining the surfaces and yet, when subjected to normal heat and pressure in joining the surfaces, provided a very satisfactory bond.

The compounding of the adhesive composition in all of the above examples was carried out substantially as follows: The non-solvents, such as toluol, were first added to wet the cellulose nitrate in order to facilitate its solution when the active solvents were added later. The active solvents, such as ethyl acetate, and the solvent softeners, such as dibutyl phthalate, were then added and the mixture agitated until complete solution was obtained. Finally, the resin constituent already dissolved in a portion of the active solvent of the ultimate formula was added and the mixing continued until homogeneity was secured. The adhesive composition was then ready for use. The adhesives described in the above examples are substantially transparent and colorless. It will be understood that these compositions may be colored by the incorporation of a suitable coloring agent, such as a dye or a pigment, or rendered opaque by the addition of a suitable filler, by processes well known in the art of preparing colored and opaque lacquers.

The above examples are given merely to illustrate specific embodiments of the invention which, in its broader phases, contemplates a heat energizable adhesive comprising a synthetic resin and a cellulose nitrate having a nitrogen content of 10.0 to 12.2%.

The viscosity characteristic of the cellulose nitrate is not critical so long as the nitrogen content is kept within the specified limits. Cellulose nitrate having a viscosity of below 4 seconds can be used satisfactorily and the upper limit of the viscosity characteristic is only dependent upon the workability of the solution for practical purposes. For application of the adhesive to a non-porous surface, such as metal, glass, regenerated cellulose sheets, and the like, a low viscosity cellulose nitrate is satisfactory, while for a porous surface, such as fabric and certain papers, a high viscosity cellulose nitrate is more to be desired. Cellulose nitrate having a viscosity of 80 seconds has been found very satisfactory for general application.

The type of polyhydric alcohol-polybasic acid synthetic resin operative in the preferred form of the present invention can be varied without limit, although certain types of polyhydric alcohol-polybasic acid synthetic resins are much more suitable than others. A resin having the property of being a solvent for cellulose nitrate and having a "high coefficient of plasticity", that is, considerable increase in mobility per degree rise in temperature is most suitable. The resins modified with non-drying oils have been found especially advantageous. Cocoanut, cottonseed, hydrogenated cottonseed, and castor oils may be mentioned as non-drying oils of particular merit. Higher aliphatic acids, such as oleic, and stearic, are also very suitable as modifying agents, but it is not preferred to use these acids in amounts greater than 50% by weight of the resin. Butyl alcohol is an outstanding alcohol modifying agent, but other high boiling alcohols, such as hexyl, propyl, amyl, and benzyl alcohols, cyclohexanol and terpineol are also useful. Resins modified with rosin or gums, such as kauri copal, and the like, may be used but they are not as desirable as resins modified with the above disclosed agents.

As is well known in the art, the polyhydric alcohol-polybasic acid synthetic resins may be made from a wide variety of polyhydric alcohols and polybasic acids. Di-hydric and trihydric alcohols, though preferred, need not necessarily be used, as the higher polyhydric compounds, such as sorbitol, pentaerythritol, and the like, may also be used. Polyhydric ether alcohols, such as diethylene glycol, triethylene glycol, monoethylin, monobenzylin, diethyl ether of sorbitol, diethyl ether of pentaerythritol, diglycerol, et cetra, are particularly advantageous because of the high compatibility and high coefficient of plasticity characteristic of resins made therefrom. In place of phthalic acid many other acids, such as malic, adipic, succinic, trimellitic, dilactylic, fumaric, and sebacic acids can be used in the manufacture of these resins.

Other resins having solvent power for cellulose nitrate and having "high coefficients of plasticity", for example, aryl sulfonamide formaldehyde resins, such as the toluenesulfonamide-formaldehyde resin used in the composition of Example 9, xylenesulfonamide-formaldehyde resins, benzenesulfonamide-formaldehyde resins, et cetra, may be used. Other resins such as vinyl acetate resins, vinyl acetate-vinyl chloride resins, and certain phenol-formaldehyde resins and urea formaldehyde resins may be used. The toluene-sulfonamide resins and the polyhydric alcohol-polybasic acid resins are preferred because of their compatibility and high coefficient of plasticity. Certain types of this latter class of resins, i. e., polyhydric alcohol-polybasic acid resins, modified with high molecular weight acids and/or higher molecular weight alcohols, or those from dihydric alcohols, particularly ether alcohols preferably with high molecular weight acids, represent the most preferred embodiment of the present invention because of their embodying the advantageous characteristics of freedom from stickiness, high coefficient of plasticity, high degree of heat energizability, higher capacity of being resoftened by high temperatures before losing their heat energizability, high compatibility with cellulose nitrate, high water resistance, and excellent strength of bond.

As shown in the examples, the proportion of cellulose nitrate to synthetic resin can be varied widely, depending upon the specific properties desired. A range of 0.6–2.0 parts of synthetic resin to one part of cellulose nitrate is preferred, but highly useful adhesive compositions may be employed with from 2–5 parts of resin to one part of cellulose nitrate. It is necessary in order to provide a satisfactory adhesive composition that the synthetic resin be compatible with the cellulose nitrate, that is, the synthetic resin must not separate from the cellulose nitrate when deposited in a film but give a homogeneous coating.

As shown in the above examples, the use of a plasticizer in these adhesive compositions is optional and dependent, to a considerable degree, upon what properties are desired in the adhesive and the type of synthetic resin employed. For example, if the adhesive composition contains cellulose nitrate and, as a synthetic resin, diethylene glycol phthalate, or other polybasic acid ester of a dihydric ether alcohol, no plasticizer is necessary, since these resins are of the soft, low melting type and sufficient heat energizability is developed through this medium, but in other cases where the synthetic resin is of the harder type, the addition of plasticizer is preferred in order to obtain sufficient heat energizability to provide satisfactory bonding properties at suitable temperatures. When a plasticizer is used, it should be selected from the so-called "solvent" type, that is, a solvent for cellulose nitrate. Such plasticizers as dibutyl phthalate, dibutyl tartrate, tricresyl phosphate, triacetin, and ethyl meta-sulfonamide are suitable.

With respect to the solvent mixtures employed in these compositions, their function is simply to provide a suitable vehicle for the film forming ingredients in order that a satisfactory film may be laid and they do not affect the operation of the composition after the film has dried out. The solvents and solvent mixtures which may be employed will readily occur to those skilled in the art. The proportions of ingredients in the solvent mixture and the proportion of solvent to film forming ingredients in these compositions may be varied almost without limit, depending on the particular properties of the adhesive composition desired, as will be understood by those skilled in the art.

The adhesive compositions of the present invention are practically identical with ordinary cellulose nitrate lacquers in appearance and can be applied to objects which are to be cemented together in exactly the same manner as clear lacquers are applied; namely, by brushing, dipping, spraying, or roller coating methods. The adhesive compositions are light in color and deposit a clear, nearly colorless film. After applying the adhesive to the objects which are to be joined together, the adhesive film is allowed to dry, which operation usually takes from 3–20 minutes at room temperature, depending somewhat on the type of material coated and the particular composition of the adhesive. Force drying, of course, may be employed. When the solvents of the composition have completely evaporated, the objects to be cemented together are brought into intimate contact with each other and heated with a heat press, roll, or flat-iron. An ordinary electric flat-iron may be used. A temperature of 130–150° C. is suitable and little pressure is necessary, 2 to 15 pounds per square inch being sufficient, although it will be apparent that greater pressure is desirable. The exact heating time is largely dependent on the conductivity of the material through which the heat must pass to melt the adhesive, but in cementing most materials the heat need be applied only momentarily. On cooling, the adhesive will set up quickly and will develop a strong bond between the objects cemented together.

By employing pressures of 50–10,000 pounds per square inch these adhesive compositions will give a good bond without supplying heat from any external source, although ordinarily it is more convenient to employ light pressure and heat.

The adhesive compositions of the present invention, and particularly those employing polyhydric alcohol-polybasic acid resins, deposit films which are characterized by a considerable degree of elasticity, excellent initial and retained flexibility and adhesion and have very little color, odor, or taste. Furthermore, the bond is waterproof and, unlike rubber adhesives, the adhesive films are, in general, not susceptible to oxidation and are, therefore, of greatly improved durability over films deposited from the known rubber adhesives. Since these adhesive compositions do not depend upon evaporation of solvent to set up, they can be used to advantage between impervious surfaces. A particular advantage of these adhesives lies in the fact that when used with relatively light weight materials, such as paper, cardboard, regenerated cellulose sheets, and the like, they do not cause warping, curling, or staining.

The heat energizable compositions of the present invention are apparently substantially unchanged chemically upon heating to give a bond, since a bond of exceptional strength may be secured by a momentary application of heat in most instances. It is believed that the resin component of the adhesive is substantially unaffected by the heat, except where prolonged or a very high temperature is employed, and that practically no polymerization occurs. This is borne out by the fact that the adhesive film may be again softened, at least once, after the bond has been effected by further application of heat. This critical point of softening is, however, sufficiently far above normal temperatures so that there is an ample safety factor against possible loosening or slipping of the bond at normal temperatures.

Another advantage of the adhesive compositions of the present invention is that they give films of such flexibility and elasticity that they allow the embossing of bonded materials such as paper, fabrics, leather, and the like, without destruction of the bond. These properties also are of distinct advantage where two surfaces of dissimilar coefficients of linear expansion are joined, a successful bond for this purpose being dependent on a slight amount of elasticity or cold flow. Also materials coated with the adhesives of the present invention may be stored for extended periods without danger of sticking together and without loss of adhesive qualities, so that they may be united at any desired time upon the application of heat and pressure.

While there are many uses for the adhesives herein described, which will readily occur to those skilled in the art, a partial list of uses for which these adhesives have been found particularly adapted is given below:

1. Regenerated cellulose sheets (plain or moisture proofed) to fabric, paper, cardboard, metal foil, regenerated cellulose sheets, leather, tissue paper, and cellulose ester films;
2. Fabric to fabric, paper, cellulose ester films, fiber board, metal foil, and lacquered or rubberized fabric;
3. Metal foil to metal foil, wood, paper, cardboard, glass, and tissue paper;
4. Veneer to wood and fiber board;
5. Glass to glass and cellulose ester films.

The adhesives of the present invention are particularly useful in cementing aluminum foil to various impermeable surfaces for the following practical purposes:

1. For coating the inside of various types of tanks in order to make them more resistant to the solution stored in the tank;
2. For coating the outside of petroleum field tanks and various other tanks in order to obtain the maximum reflection of heat and hence minimum evaporation losses as well as to supply a durable coating, particularly resistant to corrosion by sulfur gases;
3. For coating pipe lines, particularly buried pipe lines;
4. For coating cables, particularly underground cables;
5. For obtaining a durable, minimum air resistant coating for fabric used on aeroplane wings and fuselage;
6. For obtaining a durable coating with minimum air resistance on the exterior of dirigibles;
7. For coating both the inside and outside of refrigerators;
8. For use as a substitute for gold-beaters' skin, and other uses where a very impermeable, light weight, flexible material is necessary;
9. For coating wood shingles in order to make them more durable.

These adhesives are also particularly useful for impregnating paper, fabric, and similar materials which are subsequently used between two surfaces which are to be united. The employment of these adhesives for cementing surfaces impermeable to the passage of solvent vapors, such as metal to metal, moisture proof regenerated cellulose sheeting to moisture proof regenerated cellulose sheeting, and the like, is very advantageous due to the fact that the setting up of the present adhesives is not dependent upon evaporation of solvents. It will be apparent to those skilled in the art that most adhesives cannot be used for such purposes, as they depend upon solvent evaporation. Also, these adhesives are of particular advantage in cementing Celluloid, cellulose acetate silk, and the like, to metal or other surfaces, because the adhesive can be applied to the metal only, then on drying, the Celluloid, cellulose acetate silk, etc., can be united to the metal by heat and pressure without being brought into contact with the solvents in the adhesive, which would deleteriously affect the Celluloid, etcetera.

As many apparently widely different embodiments of this invention may be made without departing from the spirit and scope thereof, it is to be understood that the invention is not limited to the specific embodiments thereof except as defined in the appended claims.

I claim:

1. In the process of preparing laminated materials wherein thin, non-porous sheets are joined by means of a thermoplastic adhesive, the improvement which comprises applying to at least one surface of one of the sheets as the sole adhesive a thermoplastic adhesive composition comprising a cellulose derivative and from 0.6 to 5 parts of a synthetic resin compatible therewith for each part of cellulose derivative, allowing the film to dry, and uniting the said surface to a second surface by means of heat and pressure.

2. The process of claim 1 in which the resin is an alkyd resin.

3. The process of claim 1 in which the resin is a vinyl resin.

4. The process of claim 1 in which the resin is a toluenesulfonamide-formaldehyde resin.

5. As a new article of manufacture a layer of thin, flexible, non-porous material securely joined to another surface solely by means of a thermoplastic cement comprising a cellulose derivative and from 0.6 to 5 parts of a synthetic resin compatible therewith for each part of cellulose derivative.

6. The article of claim 5 in which the adhesive is an alkyd resin modified with stearic acid.

7. The article of claim 5 in which the adhesive contains a castor oil modified alkyd resin.

8. The article of claim 5 in which the adhesive contains a vinyl resin.

9. The article of claim 5 in which the adhesive contains a toluenesulfonamide-formaldehyde resin.

10. The article of claim 5 in which the adhesive contains 1 part of cellulose nitrate and between .6 and 2 parts of a synthetic resin.

11. The article of claim 5 in which the adhesive contains 1 part of cellulose derivative and from .6 to 5 parts of resin compatible therewith and being soft and adhesive at a temperature between 130° C. and 150° C. under a pressure of 2 to 15 pounds per square inch.

12. The article of claim 5 in which the non-porous surface is regenerated cellulose.

13. The article of claim 5 in which the non-porous surface is metal foil.

14. A laminated materal comprising at least one non-porous surface joined to a second surface by means of the residue of a thermoplastic cement having approximately the following composition:

| | Percent |
|---|---|
| Cellulose nitrate | 8.2 |
| Diluent | 39.0 |
| Active solvent | 33.0 |
| Solvent plasticizer | 6.4 |
| Thermoplastic synthetic resin | 13.4 |

DONALD E. EDGAR.